United States Patent [19]
Bush et al.

[11] Patent Number: 6,158,027
[45] Date of Patent: Dec. 5, 2000

[54] ENHANCED NOISE-PREDICTIVE MAXIMUM LIKELIHOOD (NPML) DATA DETECTION METHOD AND APPARATUS FOR DIRECT ACCESS STORAGE DEVICE (DASD)

[75] Inventors: Gregory S. Bush, Rochester, Minn.; Roy D. Cideciyan, Rueschlikon, Switzerland; Jonathan D. Coker, Rochester, Minn.; Evangelos S. Eleftheriou, Zurich, Switzerland; Richard L. Galbraith; David J. Stanek, both of Rochester, Minn.

[73] Assignee: International Business Machines Corporation, Armonk, N.Y.

[21] Appl. No.: 09/144,230

[22] Filed: Aug. 31, 1998

[51] Int. Cl.⁷ .................................................. H03M 13/00
[52] U.S. Cl. ........................ 714/709; 714/746; 714/794; 375/341
[58] Field of Search .................................. 714/709, 794, 714/746; 375/341

[56] References Cited

U.S. PATENT DOCUMENTS

| | | |
|---|---|---|
| 4,707,681 | 11/1987 | Eggenberger et al. . |
| 4,786,890 | 11/1988 | Marcus et al. . |
| 5,196,849 | 3/1993 | Galbraith . |
| 5,220,466 | 6/1993 | Coker et al. . |
| 5,233,482 | 8/1993 | Galbraith et al. . |
| 5,241,309 | 8/1993 | Cideciyan et al. . |
| 5,258,940 | 11/1993 | Coker et al. . |
| 5,268,848 | 12/1993 | Coker et al. . |
| 5,343,340 | 8/1994 | Boutaghou et al. . |
| 5,426,541 | 6/1995 | Coker et al. . |
| 5,442,492 | 8/1995 | Cunningham et al. . |
| 5,521,945 | 5/1996 | Knudson . |
| 5,619,539 | 4/1997 | Coker et al. ............................ 375/341 |
| 5,635,933 | 6/1997 | Fitzpatrick et al. . |
| 5,689,532 | 11/1997 | Fitzpatrick ............................ 375/341 |
| 5,784,010 | 7/1998 | Coker et al. . |
| 5,949,831 | 9/1999 | Coker et al. ............................ 375/341 |

FOREIGN PATENT DOCUMENTS

| | | | |
|---|---|---|---|
| 0581717A2 | 2/1994 | European Pat. Off. | G06F 11/00 |
| 9429989 | 12/1994 | European Pat. Off. | H04L 25/03 |
| 2286952A | 8/1995 | United Kingdom | H04L 25/497 |

OTHER PUBLICATIONS

IBM Technical Disclosure Bulletin, "Difference Metric Decoder for Interleaved Biphase Trellis Code", by T. Howell, R. Karabed and P. Siegel, vol. 31, No. 7, Dec. 1988.

IBM Technical Disclosure Bulletin, "Class of Partial Response Systems for Increasing Storage Density in Magnetic Recording", by A. M. Patel and H. K. Thapar, vol. 32, No. 3B, Aug. 1989.

"Noise–Predictive Maximum Likelihood (NPML) Detection", IEEE Transactions on Magnetics, vol. 34, No. 1, Jan. 1998, pp. 110–117.

"Noise–Predictive Maximum–Likelihood (NPML) Detection for the Magnetic Recording Channel", IEEE Proceedings of the International Conference on Communications (ICC), US, New York, 1999, pp. 556–560.

"Noise–Predictive Partial–Response Equalizers and Applications", IEEE Proceedings of the International Conference on Communications (ICC), US, New York, 1992, pp. 942–947.

*Primary Examiner*—Phung M. Chung
*Attorney, Agent, or Firm*—Joan Pennington

[57] ABSTRACT

A noise-predictive data detection method and apparatus are provided for enhanced noise-predictive maximum-likelihood (NPML) data detection in a direct access storage device. A data signal from a data channel in the direct access storage device is applied to a maximum-likelihood detector that provides an estimated sequence signal. A noise bleacher filter having a frequency response of $(1+\alpha D)/1-\beta D^2)$ receives a combined estimated sequence signal and data signal and provides a noise filtered signal. A matching and error event filter receives the noise filtered signal and provides an error event filtered signal. An error correction unit receives the estimated sequence signal from the maximum-likelihood detector and receives the error event filtered signal and provides an error corrected estimated sequence signal.

20 Claims, 16 Drawing Sheets

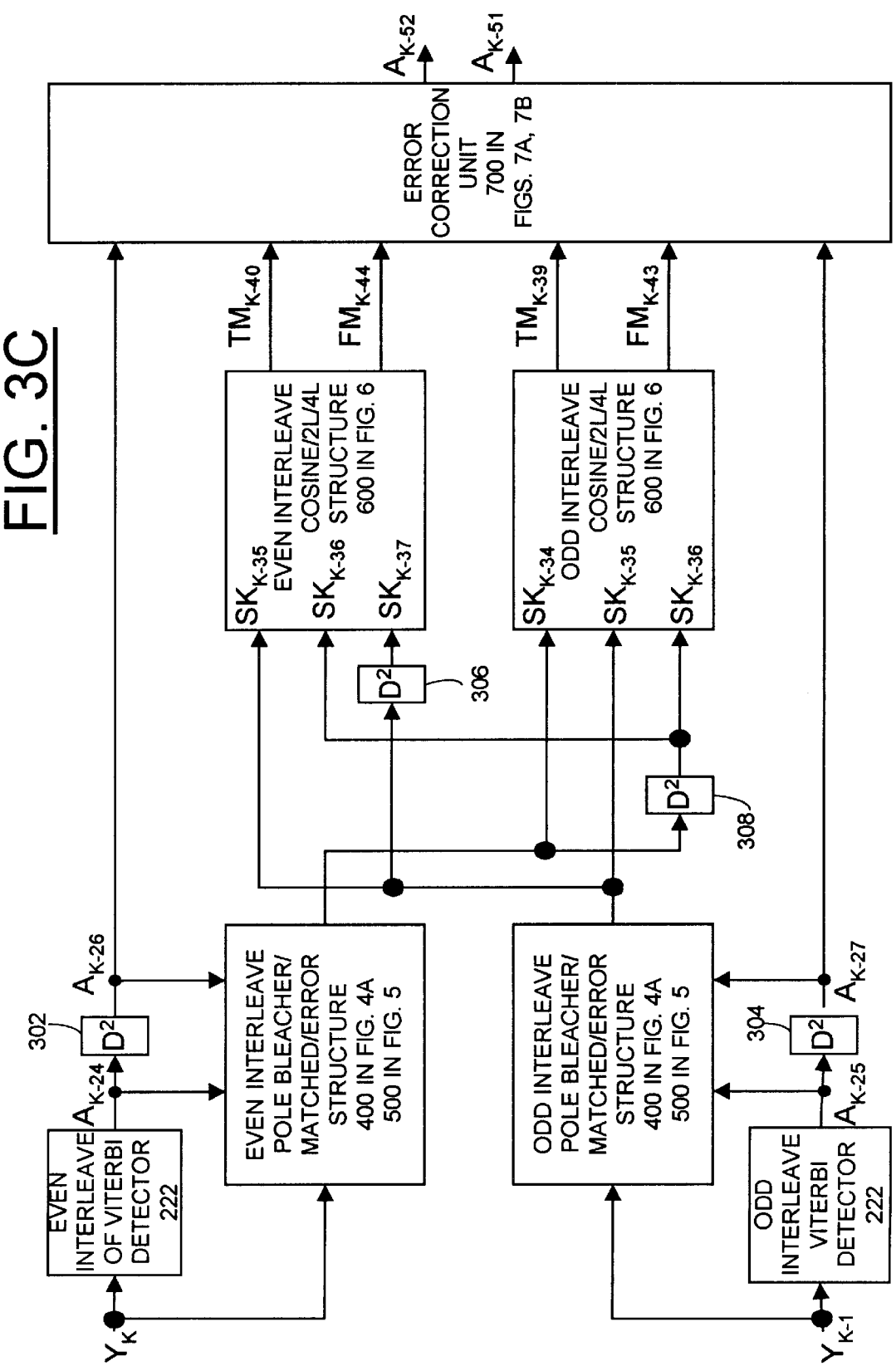

REQUIRED MEMORY INITIALIZATION (ONE OF MANY POSSIBILITIES)

SET MEMORY ELEMENTS TO THESE INITIAL VALUES (-31.5)　　 0 0 0 0 0 0　　 $R^{5.0}_{K-26}$ (-63)　　　 0 0 0 0 0 0　　 $R^{5.0}_{K-28}$ (-126)　　 0 0 0 0 0 0　　 $R^{5.0}_{K-30}$ (-252)　　 0 0 0 0 0 0　　 $R^{5.0}_{K-32}$ (-472.5)　 0 0 0 1 0 0 1 1 1　$L^{9.0}_{K-26}$

FIG. 4B

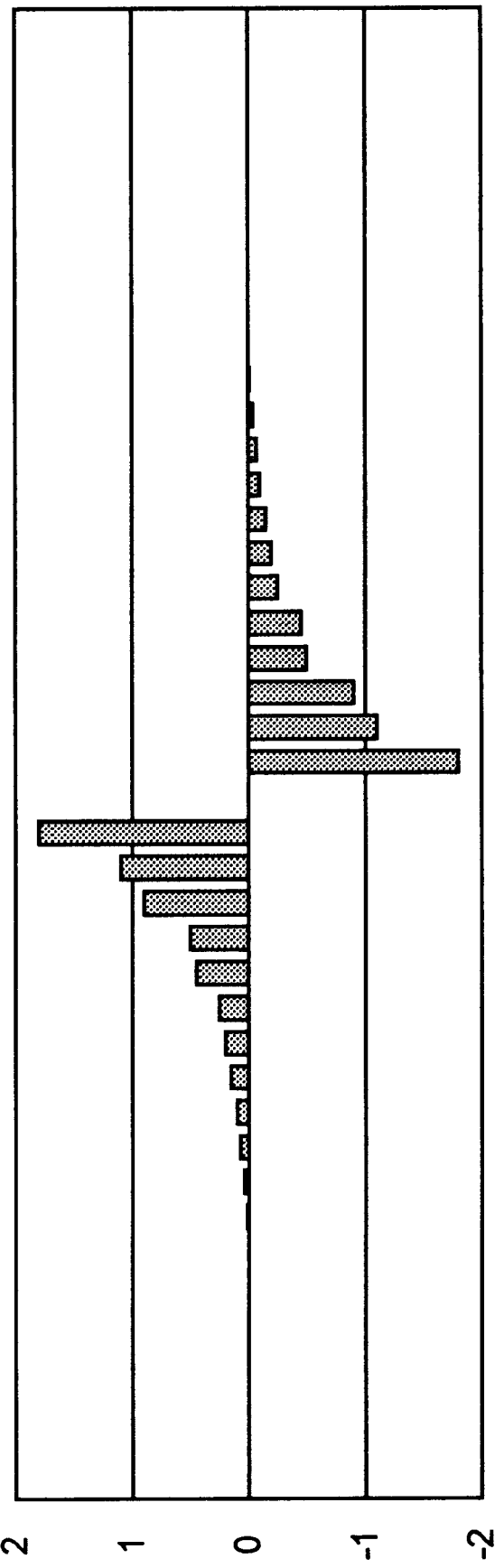

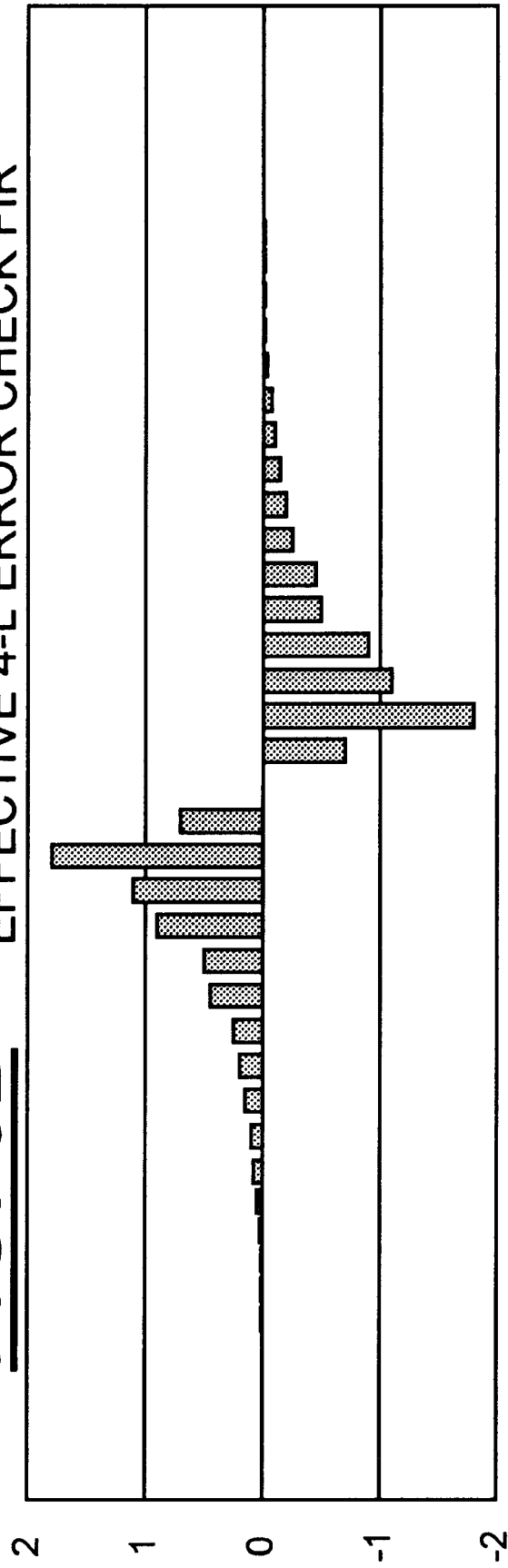
FIG. 8B  IDEAL OVERALL FILTER RESPONSE
EFFECTIVE 4-L ERROR CHECK FIR

GLOBAL DATA STREAM ERROR CHECK SIGNALS FOR 2-L ERROR INJECTED INPUT

ENHANCED NOISE-PREDICTIVE MAXIMUM LIKELIHOOD (NPML) DATA DETECTION METHOD AND APPARATUS FOR DIRECT ACCESS STORAGE DEVICE (DASD)

FIELD OF THE INVENTION

The present invention relates to methods and apparatus for detecting data, and more particularly to, a noise-predictive data detection method and apparatus for enhanced noise-predictive maximum-likelihood (NPML) data detection in a direct access storage device.

DESCRIPTION OF THE RELATED ART

A partial-response maximum-likelihood (PRML) detection channel advantageously is used to achieve high data density in writing and reading digital data on the disks. U.S. Pat. No. 4,786,890 discloses a class-IV PRML channel using a run-length limited (RLL) code. The disclosed class-IV partial response channel polynomial equals $(1-D^2)$, where D is a one-bit interval delay operator and $D^2$ is a two-bit interval delay operator and the channel response output waveform is described by taking the input waveform and subtracting from it the same waveform delayed by a two-bit interval. A (0,k=3/k1=5) PRML modulation code is utilized to encode 8 bit binary data into codewords comprised of 9 bit code sequences, where the maximum number k of consecutive zeroes allowed within a code sequence is 3 and the maximum number k1 of consecutive zeroes in the all-even or all-odd sequences is 5. Various improvements have been implemented in PRML detection channels in disk drives.

For example, U.S. Pat. No. 5,196,849 issued Mar. 23, 1993 to Richard L. Galbraith and assigned to the present assignee, discloses apparatus and a method for encoding a predefined number of bits of binary data into codewords having a predefined number of bits for PRML data channels. Rate 8/9 block codes having maximum ones and run length constraints $(0,8,12,\infty)$ and $(0,8,6,\infty)$ are disclosed for providing timing and gain control and reduced susceptibility to misequalization effects in PRML detection channels.

U.S. Pat. No. 5,233,482 to Richard L. Galbraith, Gregory J. Kerwin and Joe M. Poss, issued Aug. 3, 1995 to the present assignee, discloses thermal asperity compensation methods and apparatus for data detection in a PRML data channel. An example of a self equalization adjustment arrangement for data detection in a PRML data channel is provided by U.S. Pat. No. 5,426,541 to Jonathan D. Coker, Richard L. Galbraith et al., issued Jun. 20, 1995 to the present assignee. U.S. Pat. No. 5,619,539 to Jonathan D. Coker et al., issued Apr. 8, 1997 to the present assignee, discloses methods and apparatus for partial-response maximum-likelihood (PRML), extended partial-response maximum-likelihood (EPRML), and Viterbi data detection in a direct access storage device (DASD).

Maximum-likelihood sequence detection is an optimal detection method when the noise at the detector input is additive white gaussian noise (AWGN). The partial-response maximum-likelihood (PRML) Class IV detector is not optimal at user bit densities of PW50>2T due to significant coloring of the system noise. This colored noise at the input of the maximum-likelihood sequence detector (MLSD), such as a Viterbi detector, degrades the soft error rate (SER) performance of the channel. A need exists for a different detection method that provides better performance.

SUMMARY OF THE INVENTION

A principal object of the present invention is to provide an improved noise-predictive data detection method and apparatus for enhanced noise-predictive maximum-likelihood (NPML) data detection in a direct access storage device. Other important objects of the present invention are to provide such method and apparatus substantially without negative effects; and to provide such method and apparatus that overcome some of the disadvantages of prior art arrangements.

In brief, a noise-predictive data detection method and apparatus are provided for enhanced noise-predictive maximum-likelihood (NPML) data detection in a direct access storage device. A data signal from a data channel in the direct access storage device is applied to a maximum-likelihood detector that provides an estimated sequence signal. A noise bleacher filter having a frequency response of $(1+\alpha D)/1-\beta D^2)$ receives a combined estimated sequence signal and data signal and provides a noise filtered signal. A matching and error event filter receives the noise filtered signal and provides an error event filtered signal. An error correction unit receives the estimated sequence signal from the maximum-likelihood detector and receives the error event filtered signal and provides an error corrected estimated sequence signal.

BRIEF DESCRIPTION OF THE DRAWING

The present invention together with the above and other objects and advantages may best be understood from the following detailed description of the preferred embodiments of the invention illustrated in the drawings, wherein:

FIG. 3C is a block diagram illustrating dual interleaved Viterbi and dual interleaved enhanced noise-predictive maximum-likelihood (NPML) detectors of the data channel of FIG. 2A of the present invention;

FIG. 4B is a chart illustrating exemplary initial values for memory elements of the exemplary pole bleacher filter, pole matched filter, and 2-L error filter function of FIG. 4A;

FIGS. 8A and 8B respectively illustrate an ideal overall effective 2-L and 4-L error check FIR filter response.

DETAILED DESCRIPTION OF THE PREFERRED EMBODIMENTS

Figure 1:
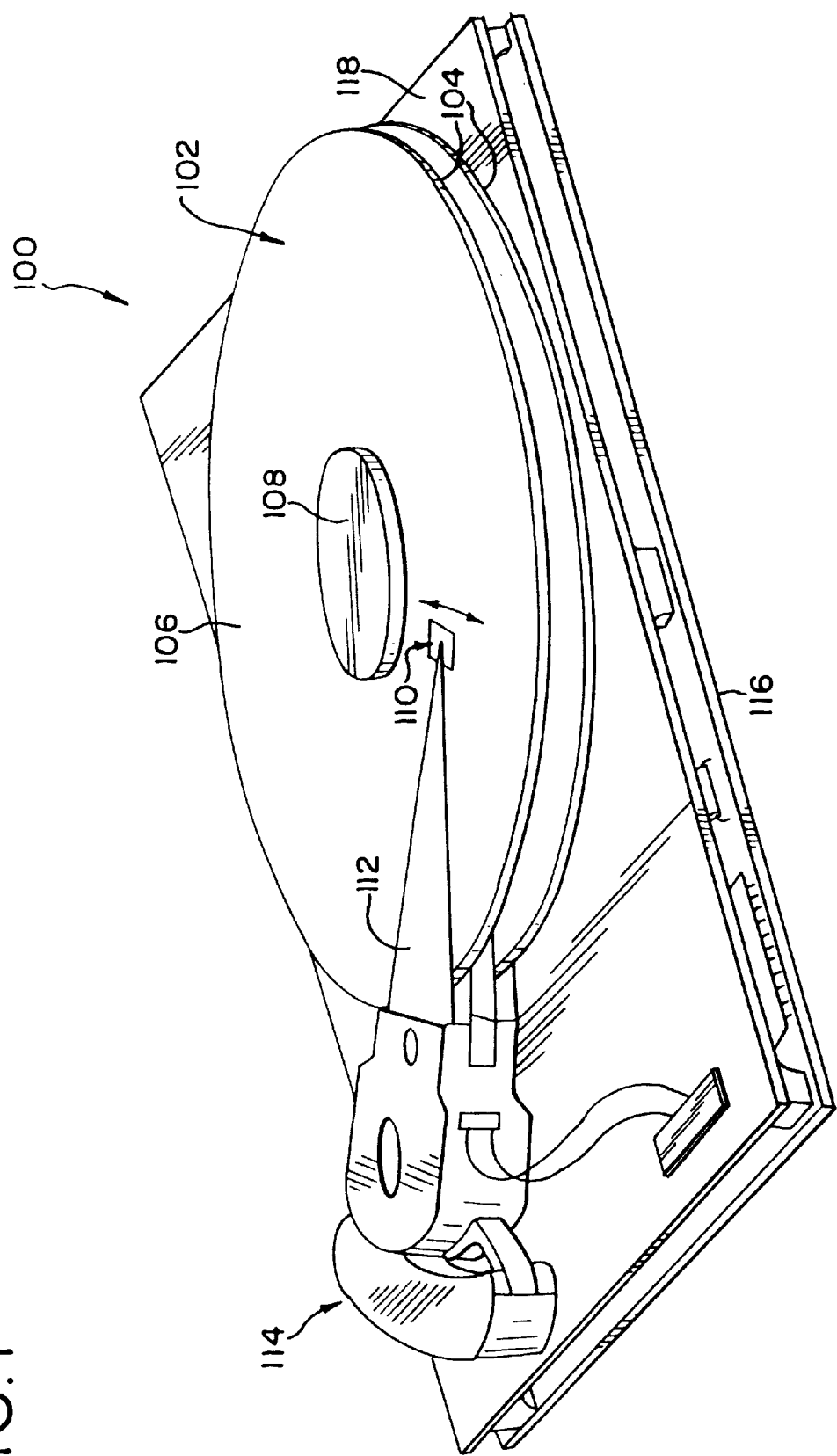
FIG. 1 is a diagrammatic view of a direct access storage device (DASD) embodying the present invention.

Having reference now to the drawings, in FIG. 1 there is illustrated a direct access data storage device (DASD) generally designated as 100 including a stack 102 of disks 104 each having at least one magnetic surface 106. The disks 104 are mounted parallel to one another for simultaneous rotation on and by an integrated spindle and motor assembly 108. Information on each magnetic disk surface 106 is read from or written to the disk surface 106 by a corresponding transducer head assembly 110 movable in a path having a radial component across the rotating disk surface 106.

Each transducer head assembly 110 is carried by an arm 112. The arms 112 are ganged together for simultaneous pivotal movement by a voice coil motor (VCM) magnet assembly 114. Drive signals applied to the VCM magnet assembly 114 cause the arms 112 to move in unison to position the transducer head assemblies 110 in registration with information storage tracks on the disk surfaces 106 where information is written or read. As shown in FIG. 1, an electronics card 116 is mounted together with a base support 118 of DASD 100. The utility of the present invention is not restricted to the details of a particular DASD construction.

Figure 2A:
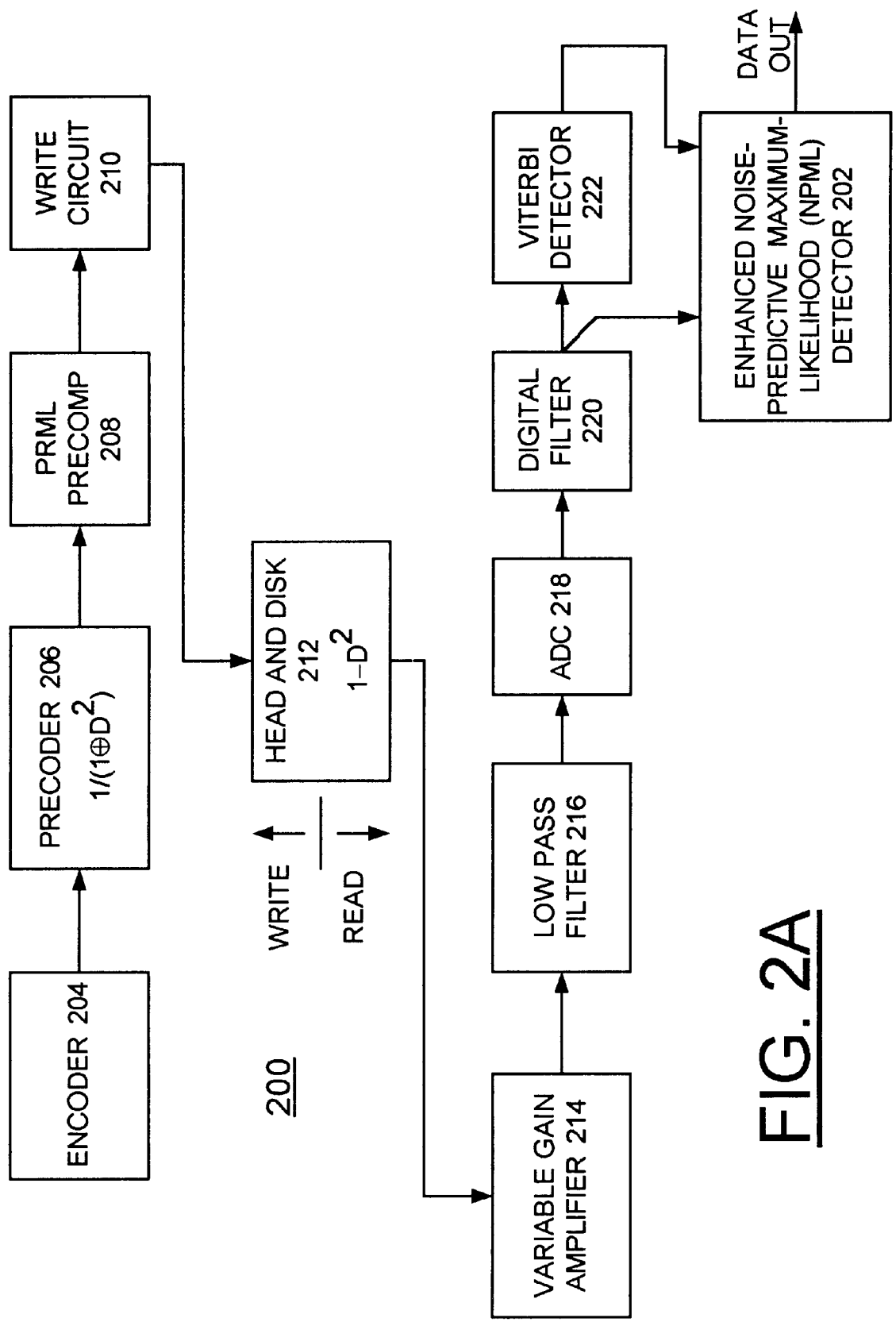
FIG. 2A is a block diagram of a data channel of the direct access storage device (DASD) of FIG. 1 embodying the present invention.

Referring now to FIG. 2A, there is shown a block diagram of a partial-response maximum-likelihood (PRML) channel 200 available in the DASD 100 including an enhanced noise-predictive maximum-likelihood (NPML) data detector 202 of the invention. In accordance with features of the invention, the enhanced noise-predictive maximum-likelihood (NPML) data detector 202 provides the benefits of noise-predictive detection without destroying the functionality of the PRML channel 200.

Data to be written is applied to an encoder 204 for providing a modulation coded output having predefined run length constraints. A precoder 206 follows the encoder 204 described by a $1/(1 \oplus D^2)$ operation where D is a unit delay operator and the symbol $\oplus$ is used to represent modulo-2 addition. Modulo-2 addition can be thought of as an exclusive or operation. A PRML precomp 208 coupled to the precoder 206 provides a modulated binary pulse signal applied to a write circuit 210 that provides the modulated write current for writing to the disk surface. An analog read signal is obtained at head and disk block 212 described by the $(1-D^2)$ operation. The read signal is applied to a variable gain amplifier (VGA) 214 and the amplified read signal is applied to a lowpass filter 216. The filtered read signal is converted to digital form by an analog-to-digital converter (ADC) 218 that provides, for example, 64 possible 6-bit sampled values. The samples of the ADC 218 are applied to a digital filter 220, such as a ten tap finite impulse response (FIR) digital filter. The filtered signal from the digital filter 220 is a class IV partial response (PR4) signal.

The PR4 signal is input to two parallel paths. The filtered PR4 signal from the digital filter 220 is applied to a Viterbi detector 222 and is applied to the enhanced noise-predictive maximum-likelihood (NPML) data detector 202 of the invention. The output of Viterbi detector 222 also is applied to the enhanced noise-predictive maximum-likelihood (NPML) data detector 202 to complete the maximum-likelihood (ML) detection process for data read back.

Figure 2B:
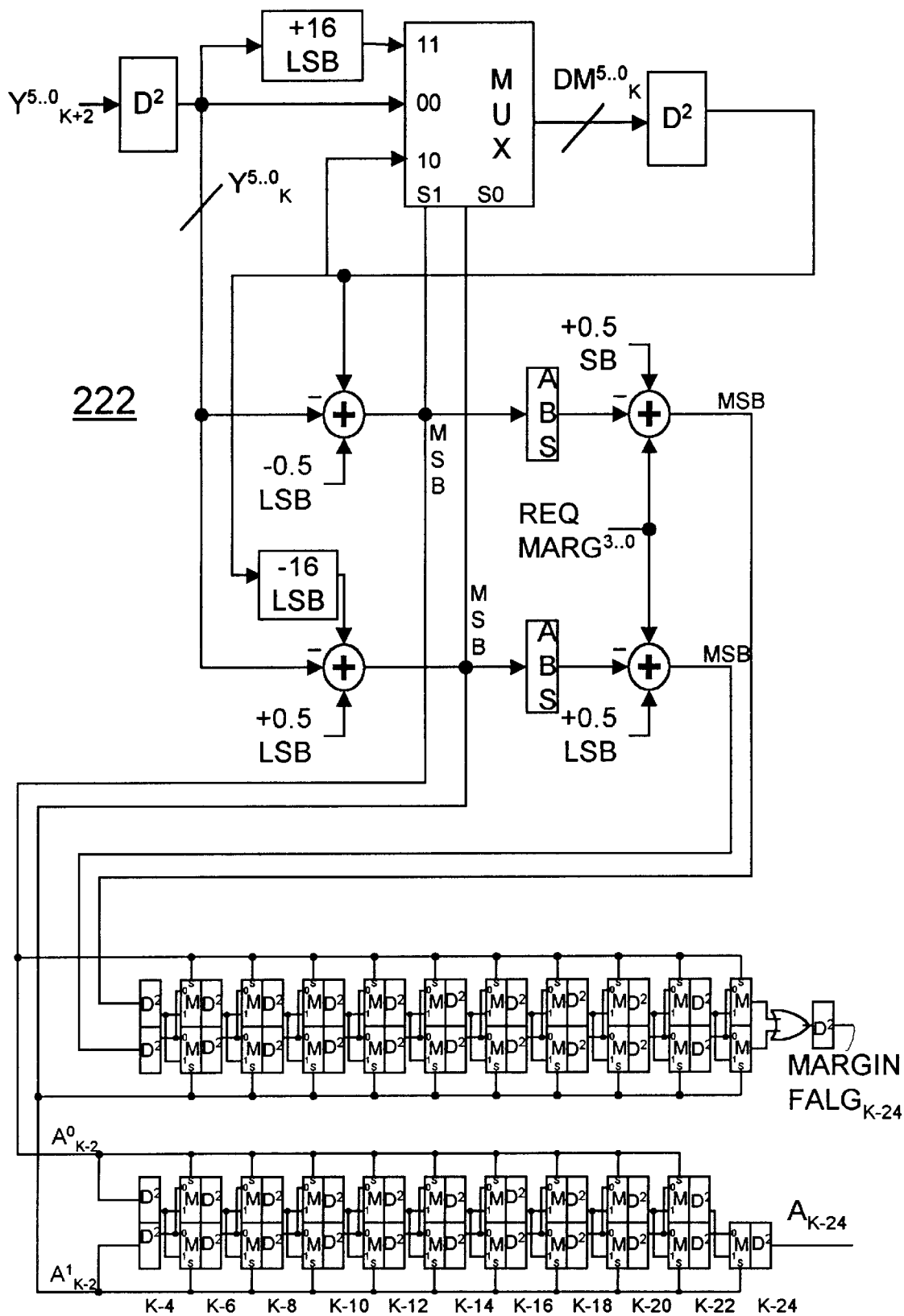
FIG. 2B is a schematic diagram illustrating an exemplary Viterbi detector implementation of FIG. 2A.

FIG. 2B illustrates an exemplary Viterbi detector 222 of the data channel 200 of FIG. 2A. It should be understood that the present invention is not limited to use with Viterbi detector 222. Features of the present invention can be used together with other maximum-likelihood detectors.

In accordance with features of the invention, the enhanced noise-predictive maximum-likelihood (NPML) data detector 202 of the invention provides error correction of an estimated sequence output data from the maximum-likelihood detector, such as a conventional PRML Viterbi detector 222. In addition to being adapted for effective use with minimal modification the DASD data channel 200, the enhanced noise-predictive maximum-likelihood (NPML) data detector 202 advantageously can be implemented in substantial part by dual interleave implementation as shown in FIG. 3C. Each interleave advantageously can operate at one-half bit rate, allowing a very high speed maximum possible data rate.

Figure 3A:
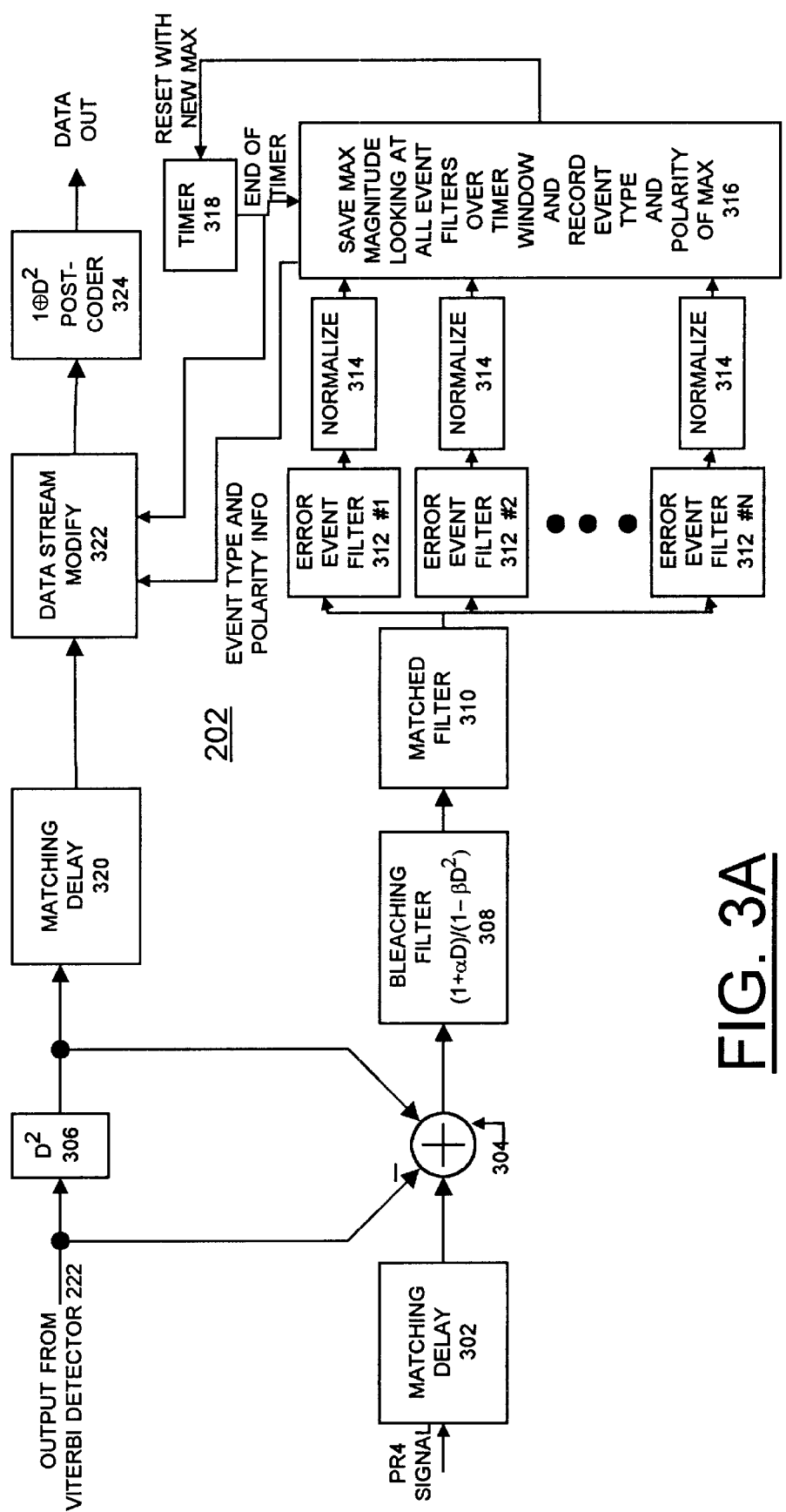
FIG. 3A is a block diagram representation of the enhanced noise-predictive maximum-likelihood (NPML) detector of FIG. 2A embodying the present invention.

Referring now to FIG. 3A, there is shown a block diagram functional representation of the enhanced noise-predictive maximum-likelihood (NPML) data detector 202 of the invention. The PR4 filtered signal from the digital filter 220 is applied to a matching delay 302 coupled to an adding function 304. The matching delay 302 provides the same time delay as the Viterbi detector 222. The output from the Viterbi detector 222 is applied via a delay function $D^2$ 306 to the adder 304. The combined signal from the adder 304 is applied to a bleaching filter 308.

In accordance with features of the invention, the enhanced noise-predictive maximum-likelihood (NPML) data detector 202 utilizes a bleaching filter 308 having a general form of a frequency response of:

$$\frac{1+\alpha D}{1-\beta D^2}$$

Figure 3B:
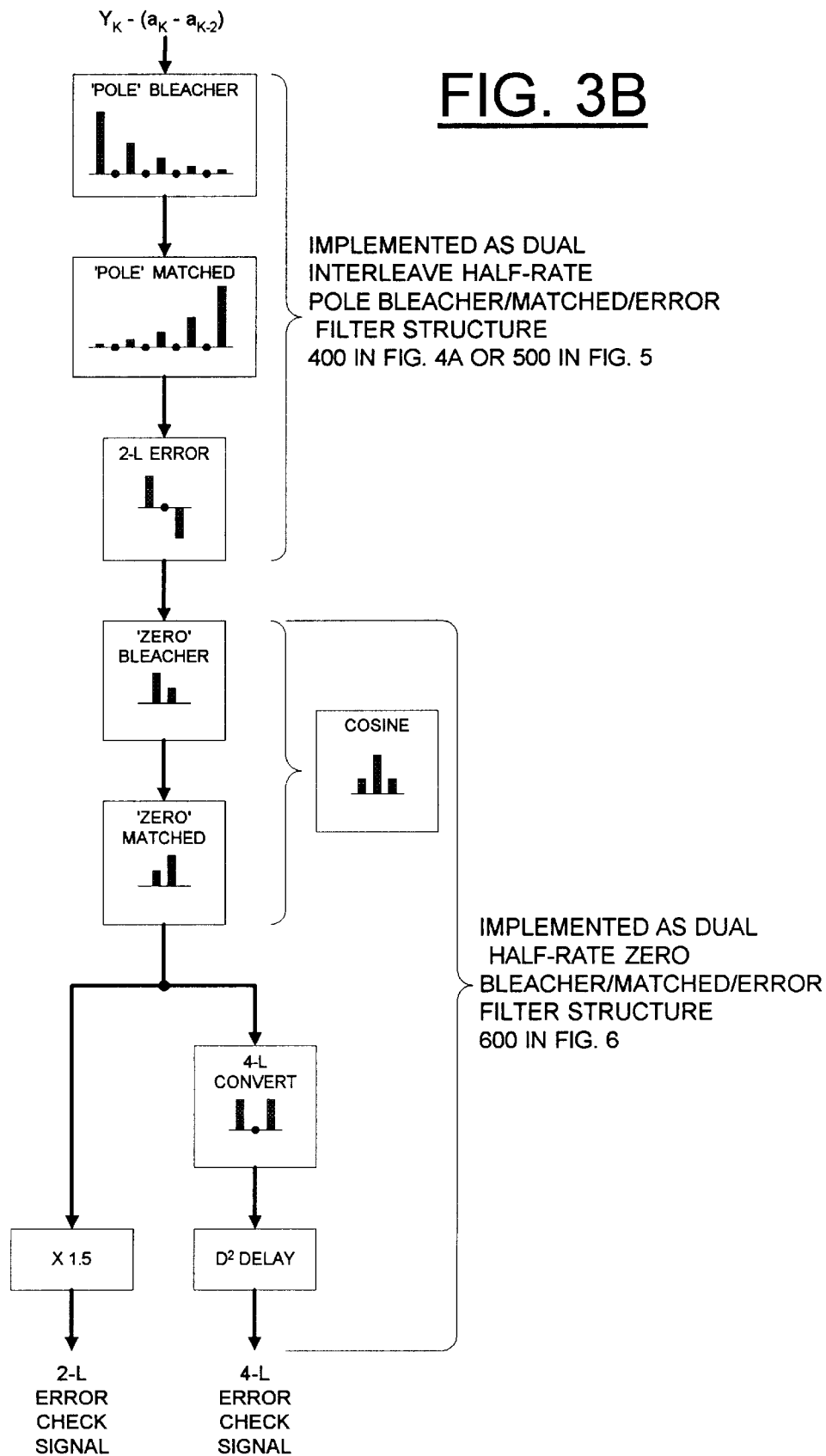
FIG. 3B is an exemplary functional diagram illustrating operation of filters including 2-L and 4-L error event filters within the enhanced noise-predictive maximum-likelihood (NPML) detector of FIG. 3A.
Figure 4A:
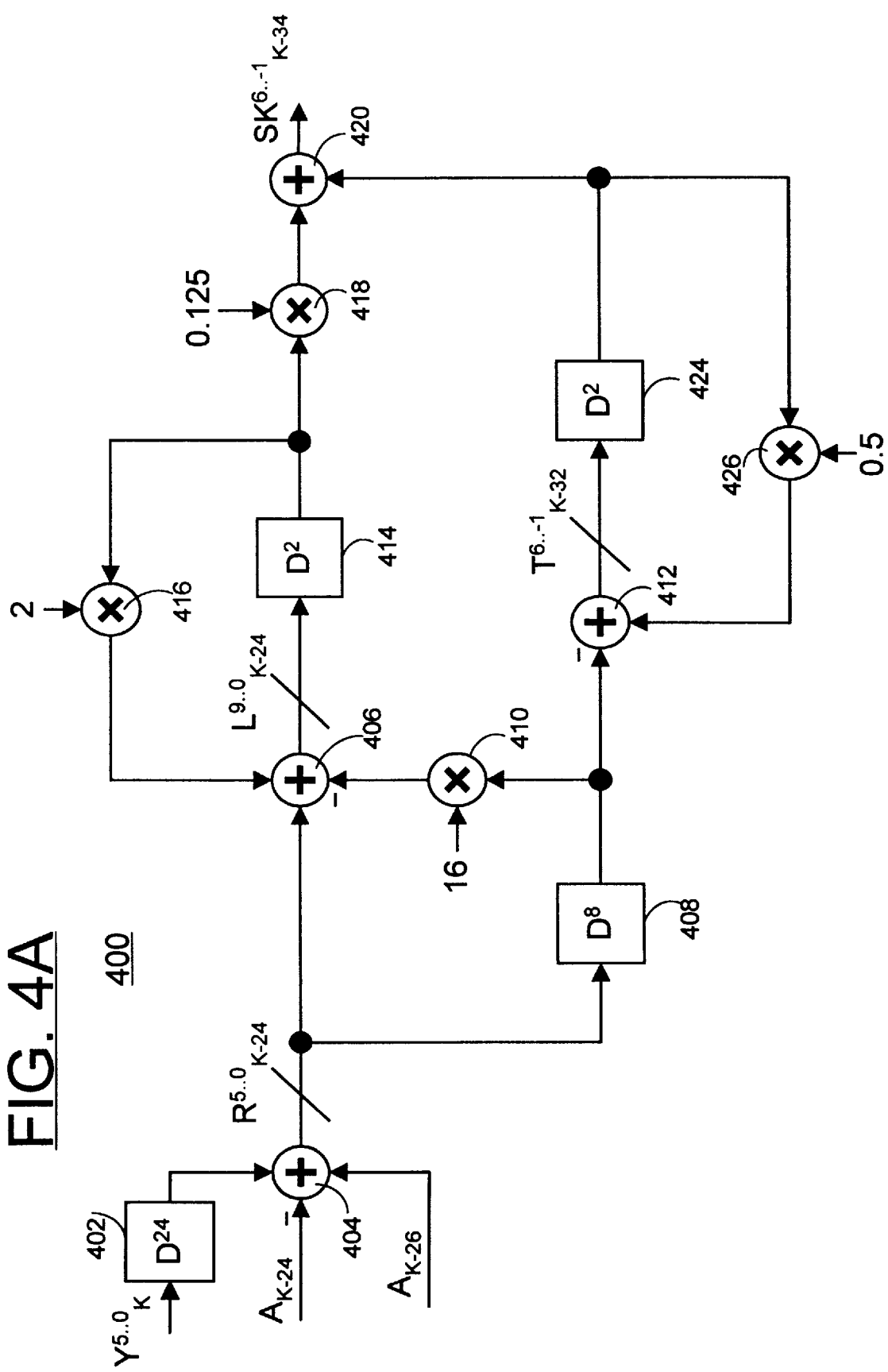
FIG. 4A is a schematic and block diagram representation illustrating an exemplary pole bleacher filter, a pole matched filter, and a 2-L error filter function of the enhanced noise-predictive maximum-likelihood (NPML) detector of FIG. 3A.
Figure 5:
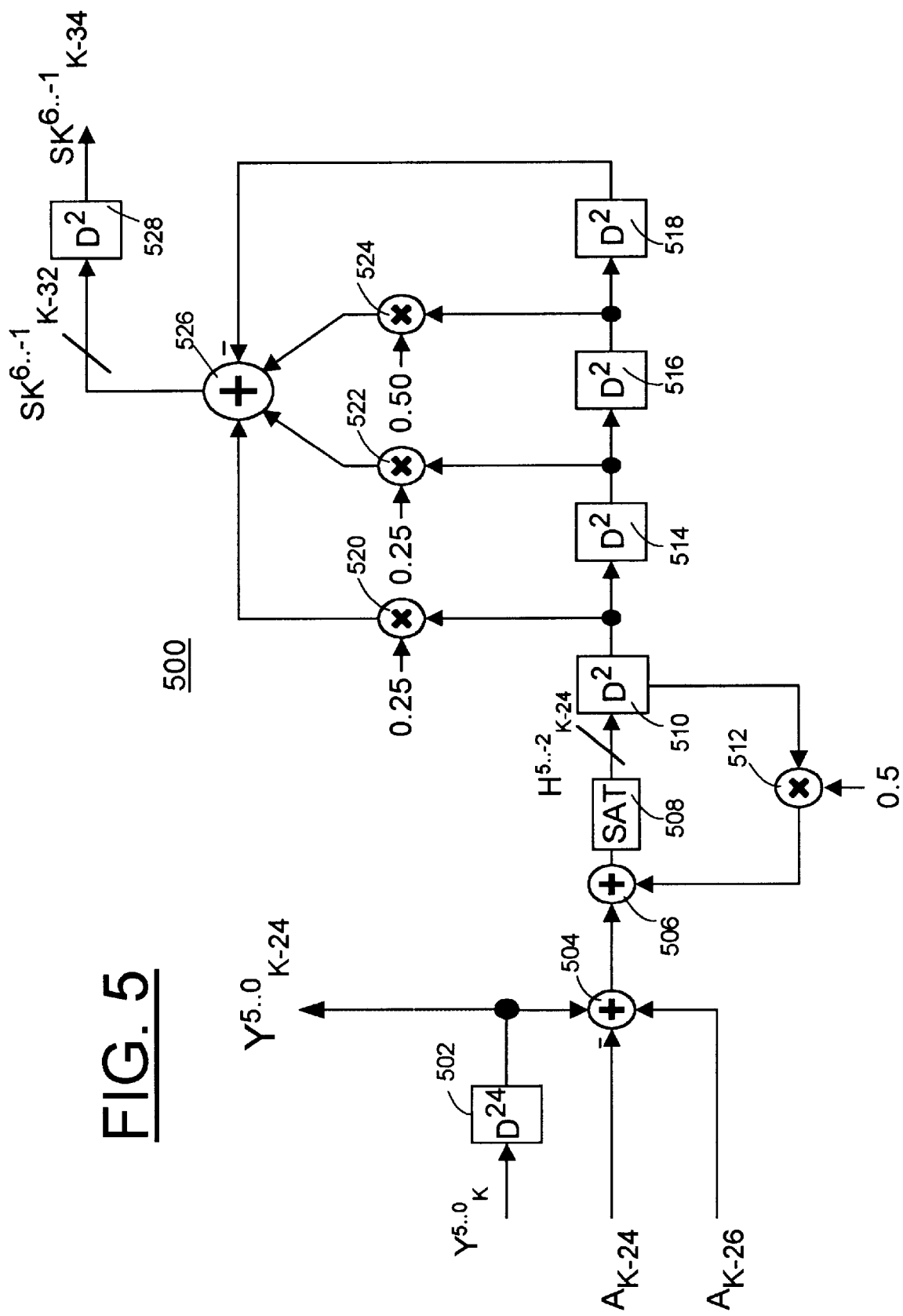
FIG. 5 is a schematic and block diagram representation illustrating an alternative pole bleacher filter, a pole matched filter, and a 2-L error filter function of the enhanced noise-predictive maximum-likelihood (NPML) detectors of FIG. 3A.
Figure 6:
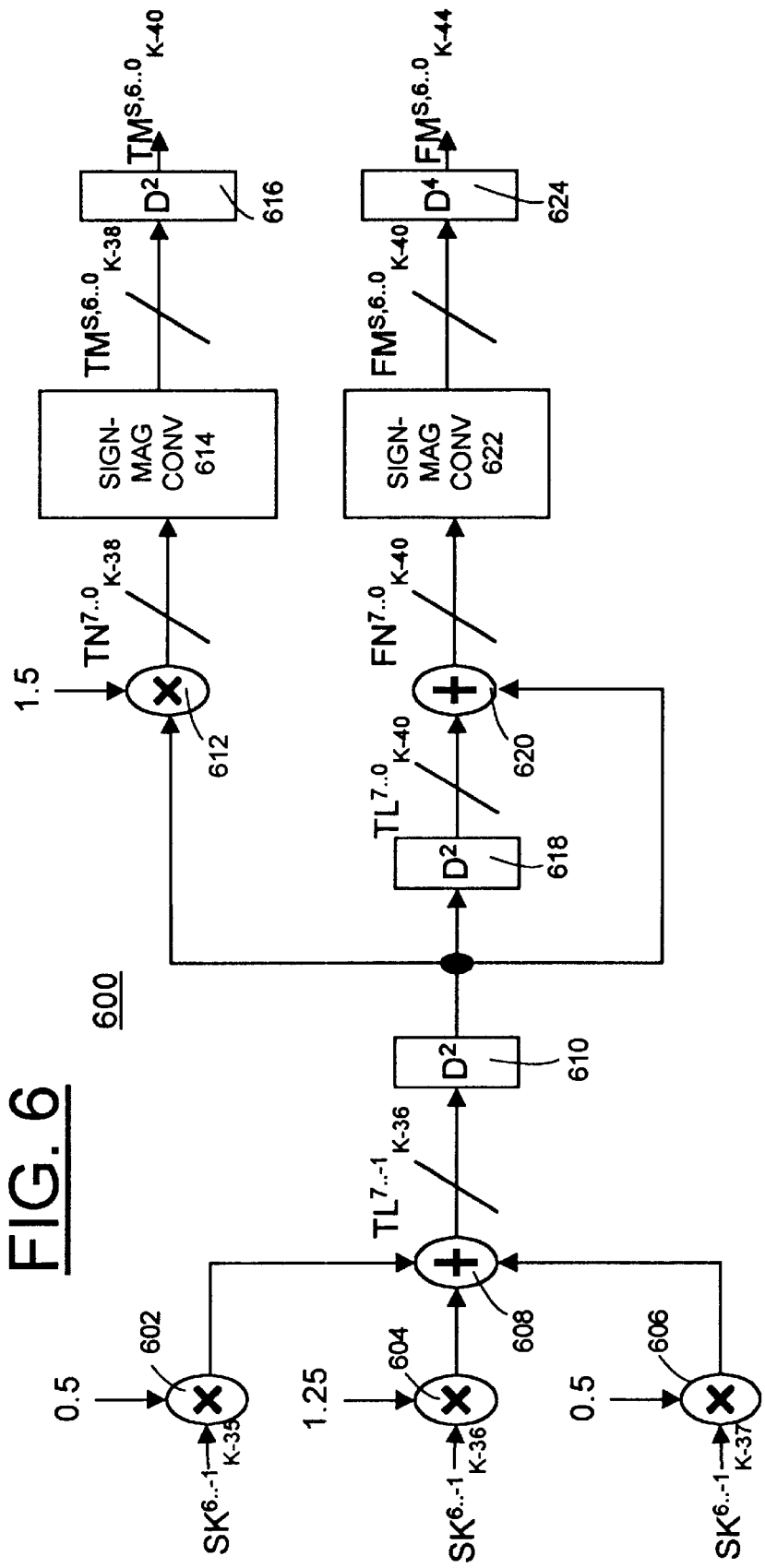
FIG. 6 is a schematic and block diagram representation illustrating a zero bleacher filter, a zero matched filter, and 2-L and 4-L error filter function of the enhanced noise-predictive maximum-likelihood (NPML) detectors of FIG. 3A.

In general, the value of both $\alpha$ and $\beta$ is a selected non-zero value that is less than 1. Exemplary implementations of the bleaching filter 308 are shown in FIGS. 4A or 5 and FIG. 6. The input to the bleaching filter 308 is derived from the delayed PR4 signal output of matching delay 306 minus the Viterbi estimated sequence or answer of the standard PR4 Viterbi detector 222 coupled by a two bit delay function ($D^2$) 306. The output of the bleaching filter 308 represents whitened or bleached noise with minimized power to make error events more recognizable. A matched filter structure 310 and a plurality of predefined error event filters (#1–#N) 312 are used to identify the most likely dominant error events after noise whitening by the bleaching filter 308. FIGS. 3B and 3C illustrate an exemplary implementation of the enhanced noise-predictive maximum-likelihood (NPML) data detector 202 including a pair of error event filters 312 to identify 2-length (2-L) and 4-length (4-L) error events. At least one error event filter 312 is used with the matched filter 310 to identify a dominant error event.

A normalizer 314 couples each of the error event filters 312 to a compare function 316 that saves a maximum magnitude error event looking at all the event filters 312 over a defined timer window set by a timer 318 and records an event type and polarity of the maximum absolute value error event. The timer 318 is reset with a new maximum magnitude error event. An end of timer is applied to the compare function 316 and a data stream modify gating 322.

The recorded event type and polarity information from the compare function 316 is applied to the modify gating 322. The modify gating is used to correct the estimated sequence data stream. An error corrected estimated sequence signal output of the modify gating 322 is applied to a $1 \oplus D^2$ postcoder 324.

Referring to FIG. 3B, a time domain representation is provided to illustrate the operation of the enhanced noise-predictive maximum-likelihood (NPML) data detector 202. The PR4 signal at time K represented by $Y_K$ minus the output of the PR4 Viterbi detector 60 represented by ($a_K - a_{K-2}$) is applied to a pole bleacher/matched/2-L error structure which is implemented as a dual interleave filter structure 400 in FIG. 4A or 500 in FIG. 5. A zero bleacher/matched/4-L error structure coupled to the bleacher/matched/error structure is implemented as a dual interleave half rate filter structure 600 in FIG. 6. As illustrated in FIG. 3B, both $\alpha$ and $\beta$ are equal to 0.5. The pole and zero filtered signal output of the bleaching filter 308 representing whitened and minimized noise is applied to the matched pole and zero filter 310 being reversed in time to the IIR bleaching filter 308. The two bit or 2-L error filter 312 and the 4-L convert error filter 312 are illustrated for identifying 2-L and 4-L error events responsive to the respective output of the matched pole and zero filter 310. A multiplier shown with a factor of 1.5 provides the 2-L error check signal. The output of the 4-L convert error filter 312 is applied to a delay function $D^2$ for providing the 4-L error check signal. The 2-L error check signal and the 4-L error check signal are not at maximum magnitude at the same time.

FIG. 3C illustrates the PR4 signal represented by $Y_K$, $Y_{K-1}$, respectively applied to dual, even and odd, interleaved Viterbi detectors 222 and respectively applied to one of dual, even and odd interleave pole bleacher, matched, and error structure 400 of FIG. 4A, or 500 of FIG. 5 of the enhanced noise-predictive maximum-likelihood (NPML) detector 202. The even and odd PR4 Viterbi outputs ($A_{K-24}$ and $A_{K-25}$) are applied to the dual, even and odd interleave pole bleacher, matched, and error structure 400 of FIG. 4A, or 500 of FIG. 5 and to an error correction unit 700 of FIGS. 7A and 7B via a respective delay function ($D^2$) 302, 304 needed for the polarity of the error event signal. The delayed even and odd PR4 Viterbi outputs ($A_{K-26}$ and $A_{K-27}$) are applied to the dual, even and odd interleave pole bleacher, matched, and error structure 400 of FIG. 4A, or 500 of FIG. 5. Sample outputs $SK_{K-35}$, $SK_{K-36}$, $SK_{K-37}$ and $SK_{K-34}$, $SK_{K-35}$, $SK_{K-36}$ respectively are applied to an even and odd interleave cosine/2-L/4-L filter structures 600 of FIG. 6 from the odd and even pole bleacher, matched, and error structures 400 of FIG. 4A, or 500 of FIG. 5. A respective delay function ($D^2$) 306, 308 provides the respective delayed sample outputs, $SK_{K-37}$ to the even interleave cosine/2-L/4-L filter structure 600 and $SK_{K-36}$ to the odd interleave cosine/2-L/4-L filter structure 600. Two and four magnitude outputs $TM_{K-40}$, $FM_{K-44}$, and $TM_{K-39}$, $FM_{K-43}$, from the respective even and odd interleave cosine/2-L/4-L filter structures 600 are applied to the error correction unit 700. The error correction unit 700 provides an error corrected estimated sequence represented by ($A_{K-52}$ and $A_{K-51}$) that is applied to the 1-$D^2$ postcoder 324 of FIG. 3C.

FIG. 4A illustrates a combined pole bleacher filter, a pole matched filter, and a 2-L error filter function generally designated by the reference character 400 of the invention. The combined pole bleacher filter, pole matched filter, and 2-L error filter function 400 is provided by a four-tap finite impulse response (FIR) filter as shown in FIG. 4A. The 6-bit (5 . . . 0) PR4 signal represented by $Y_K$ is applied via a delay function ($D^{24}$) 402 to a first adder 404. The PR4 Viterbi output signal ($A_{K-26}$ and $A_{K-24}$) are applied to the adder 404. The 6-bit (5 . . . 0) function of the adder 404 represented by $R_{K-24}$ equals $Y_{K-24}+(A_{K-26}-A_{K-24})$. Table 1 below illustrates a logical implementation for the computations of the adder 404. The output of the adder 404 is applied to a second adder 406 and a delay function ($D^8$) 408. The delay function ($D^8$) 408 is coupled to a multiply 410 shown with a factor of 16 and is coupled to a third adder 412. The 10-bit (9 . . . 0) output of the second adder 406 represented by $L_{K-24}$ is applied to a delay function ($D^2$) 414 and fed back to adder 406 via a multiply 416 shown with a factor of 2 and applied via a multiply 418 shown with a factor of $\frac{1}{8}$ or 0.125 to a fourth adder 420. Table 2 below illustrates a logical implementation for the computations of the adder 406. The 7-bit (6 . . . -1) output of the third adder 412 represented by $T_{K-32}$ is applied to a pole bleacher function defined by a delay function ($D^2$) 424 and a multiply 426 shown with a factor of 0.5. Table 3 below illustrates a logical implementation for the computations of the adder 412. Three sampled values of the 8-bit (6 . . . -1) output of the fourth adder 420 represented by $SK_{K-34}$ are applied to the odd and even interleaved cosine/2-L/4-L filter structures 600 as shown in FIGS. 3C and 6. Table 4 below illustrates a logical implementation for the computations of the adder 420. Note that the results of each of the four adders 404, 406, 412 and 420 can be sign-unextended without saturation check.

FIG. 4B illustrates exemplary initial values for memory elements of the combined pole bleacher filter, pole matched filter, and 2-L error filter function 400 of the enhanced noise-predictive maximum-likelihood (NPML) data detector 202.

FIG. 5 illustrates an alternative pole bleacher filter, a pole matched filter, and a 2-L error filter function generally designated by the reference character 500 of the invention. The combined pole bleacher filter, pole matched filter, and 2-L error filter function 500 is provided by an infinite impulse response (IIR) and a three-tap finite impulse response (FIR) filter function as shown in FIG. 5A. The 6-bit (5 . . . 0) PR4 signal represented by $Y_K$ is applied via a delay function ($D^{24}$) 502 to an adder 504. The PR4 Viterbi output signal ($A_{K-26}$ and $A_{K-24}$) are applied to the adder 504. The output of the adder 504 is applied to a second adder 506. The second adder 506 defines a pole bleacher function with a saturation checker 508, a delay function ($D^2$) 510 and a multiply 512 shown with a factor of 0.5. A logical implementation for the computations at the 7-bit (5 . . . 2) output of the saturation checker 508 represented by $H_{K-24}$ is illustrated in Table 5 below. A combined pole matched filter and 2-L error event function is defined by a plurality of delay functions ($D^2$) 514, 516, and 518, a plurality of multipliers 520, 522, and 524, respectively, shown with a factor of 0.25, 0.25 and 0.5 applied to an adder 526. The 7-bit (6 . . . -1) output of adder 526 represented by $SK_{K-32}$ is applied to a delay functions ($D^2$) providing a 7-bit (6 . . . -1) output represented by $SK_{K-34}$. Table 6 below illustrates a logical implementation for the computations of the adder 526.

FIG. 6 illustrates the interleave cosine/2-L/4-L filter structure 600 of the enhanced noise-predictive maximum-likelihood (NPML) detector 202. Sample outputs $SK_{K-35}$, $SK_{K-36}$, $SK_{K-37}$ are applied to the even interleave cosine/2-L/4-L filter structure 600 as shown in FIG. 6. A plurality of multipliers 602, 604 and 606 respectively shown with a factor of 0.5, 1.25 and 0.5 apply the sample outputs $SK_{K-35}$, $SK_{K-36}$, $SK_{K-37}$ to an adder 608. A logical implementation for the computations represented at the output of adder 608 labeled $TL_{K-36}$ is illustrated in Table 7 below. A delay function ($D^2$) 610 and a multiply 612 shown with a factor of 1.5 provide an 8-bit two-length normalized output $TN_{K-36}$ applied to a sign magnitude converter 614. Sign magnitude converter 614 provides a 9-bit sign magnitude (S, 6 . . . 0) 2-L output $TM_{K-38}$ applied to a delay function ($D^2$) 616 providing a delayed 9-bit sign magnitude (S, 6 . . . 0) 2-L output $TM_{K-40}$. A logical implementation for the computations represented at the output of multiply 612 labeled $TN_{K-38}$ is illustrated in TABLE 8 below. The adder output $TL_{K-36}$ is applied to a second delay function ($D^2$) 616 providing a delayed output $TL_{K-40}$ applied to an adder 620 with the delayed output $TL_{K-38}$ to provide an 8-bit 4-L normalized output $FN_{K-40}$ applied to a sign magnitude converter 622. A logical implementation for the computations represented at the output of adder 620 labeled $FN_{K-40}$ is illustrated in TABLE 9 below. Note that the results of logical implementations of TABLES 7, 8 and 9 can be sign-unextended without saturation check.

Figure 7A:
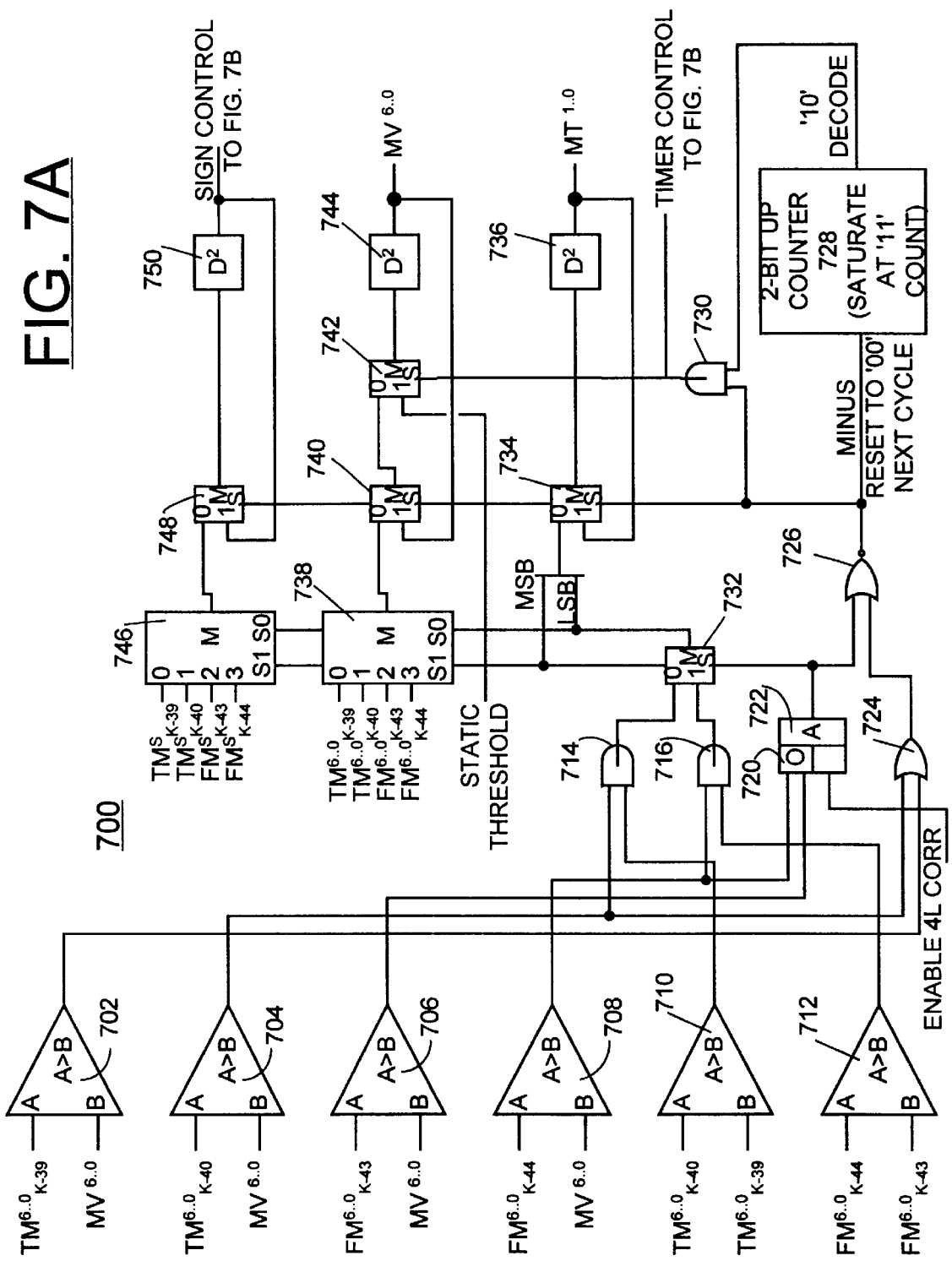
FIGS. 7A and 7B together provide a schematic and block diagram representation illustrating an error correction unit of the enhanced noise-predictive maximum-likelihood (NPML) detector of FIG. 3A.
Figure 7B:
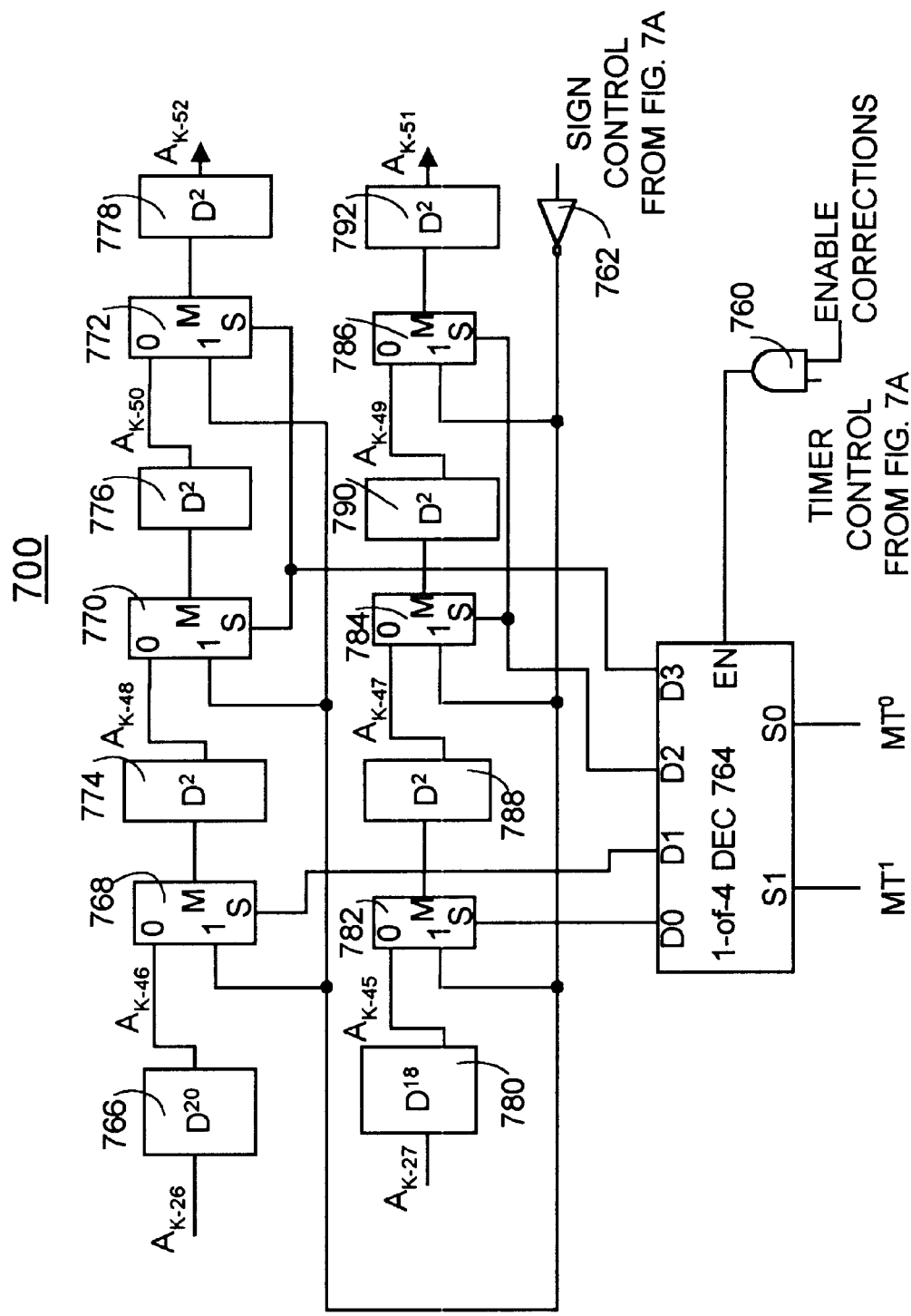

FIGS. 7A and 7B illustrate an exemplary error correction unit 700 of FIG. 3C for 2-L/4-L error corrections of the enhanced noise-predictive maximum-likelihood (NPML) detector 202. The exemplary error correction unit 700 saves a maximum magnitude error event over a defined timer window and records an event type and polarity of the maximum absolute value error event. Referring to FIG. 7A, the error correction unit 700 includes a plurality of comparators 702, 704, 706, 706, 708, 710, and 712. Comparators 702, 704 respectively compare the 8-bit two-length magnitude (6 . . . 0) outputs $TM_{K-39}$, $TM_{K-40}$ with a threshold value MV. Comparators 706, 708 respectively compare the 8-bit four-length magnitude (6 . . . 0) outputs $FM_{K-43}$, $FM_{K-44}$ with the threshold value MV. Comparator 710 compares the 8-bit two-length magnitude (6 . . . 0) outputs $TM_{K-40}$, $TM_{K-39}$. Comparator 712 compares the 8-bit four-length magnitude (6 . . . . 0) outputs $FMZ_{K-40}$, $FM_{K-39}$. Comparing two-length (2-L) magnitude outputs and four-length (4-L) magnitude outputs is not required because a maximum magnitude 2-L and 4-L cannot occur at the same time.

The output of the $TM_{K-40}$/threshold comparator 704 is applied to an AND gate 714 with a second input of AND gate 714 connected to the output of $TM_{K-40}$, $TM_{K-39}$ comparator 710. The output of $FM_{K-44}$/threshold comparator 708 is applied to an AND gate 716 and to an OR gate 720 with a second input of AND gate 716 connected to the output of the $FM_{K-40}$, $FM_{K-39}$ comparator 712. A second input to OR gate 720 is connected to the $FM_{K-43}$/threshold comparator 706. The output of OR gate 720 is connected to an AND gate 722. A second input to AND gate 722 is connected to an enable 4-L error correction input. The output of the $TM_{K-40}$/threshold comparator 704 is applied to an OR gate 724 with a second input of OR gate 724 connected to the $TM_{K-39}$/threshold comparator 702. The output of AND gate 722 is applied to a NOR gate 726 with a second input to NOR gate 726 connected to the output of OR gate 724.

The NOR gate 726 provides a reset input to a 2-bit up counter 728 and an input to an AND gate 730. The counter 728 saturates at a '11' count providing a '10' decode output. The timer counter 728 is reset with each new maximum magnitude 2-L/4-L error event. The output of timer counter 728 provides a second input to AND gate 730 providing a TIMER CONTROL signal. The AND gates 714 and 716 are applied to inputs 0, 1 of a multiplexer 732 providing a least significant bit LSB input to an input 0 of a multiplexer 734. The NOR gate 726 provides a select input S of multiplexer 734. Multiplexer provides a 2-bit (1 . . . 0) magnitude type MT output via delay function ($D^2$) 736 fed back to an input 1 of a multiplexer 734.

A plurality of series connected multiplexers 738, 740, 742 provide the 7-bit (6 . . . 0) magnitude value MV output of a delay function ($D^2$) 744 which is fed back to an input 1 of a multiplexer 740. A STATIC THRESHOLD value is applied to the input 1 of multiplexer 742. TABLE 10 below illustrates select bits for the pole bleacher, matched, 2-L filter structure 400 of FIG. 4A. TABLE 11 below illustrates select bits for the pole bleacher, matched, 2-L filter structure 500 of FIG. 5. The 2-L/4-L magnitude values $TM_{K-39}$, $TM_{K-40}$ $FM_{K-43}$, $FM_{K-44}$ are applied to respective inputs 0, 1, 2, 3 of the multiplexer 738. The 2-L/4-L sign value of $TM_{K-39}$, $TM_{K-40}$ $FM_{K-43}$, $FM_{K-44}$ is respectively applied to inputs 0, 1, 2, 3 of a multiplexer 746 that is connected to a multiplexer 748. The multiplexers 746, 748 provide a SIGN CONTROL value indicated at an output of a delay function ($D^2$) 750 which is fed back to an input 1 of a multiplexer 748. The output of AND gate 722 is applied to a select input S of multiplexer 732, a select input S1 of multiplexer 738, a select input S1 of multiplexer 746, and a most significant bit MSB input to multiplexer 734. The output of NOR gate 726 is applied to a select input S of multiplexers 734, 740 and 748.

Referring to FIG. 7B, the error correction unit 700 includes an AND gate 760 receiving the TIMER CONTROL signal from FIG. 7A and a second input receiving an ENABLE CORRECTIONS input for enabling corrections by the enhanced noise-predictive maximum-likelihood (NPML) detector 202. A inverter 762 inverts the SIGN CONTROL input from FIG. 7A. An 1-of-4 decoder 762 receives the 2-bit (1 . . . 0) magnitude type MT output of delay function ($D^2$) 736 from FIG. 7A at inputs S1, S0, and is enabled by the TIMER CONTROL signal via AND gate 760. Even estimated sequence Viterbi output signal $A_{K-26}$ is applied to a delay function ($D^{20}$) 766 coupled to a plurality of series connected multiplexers 768, 770, 772 via a plurality of respective delay functions ($D^2$) 774, 776, and 778. Odd estimated sequence Viterbi output signal $A_{K-27}$ is applied to a delay function ($D^{20}$) 780 coupled to a plurality of series connected multiplexers 782, 784, 786 via a plurality of respective delay functions ($D^2$) 788, 790, and 792. The SIGN CONTROL is applied to the 1 input of multiplexers 768, 770, 772, 782, 784, and 786. The 1-of-4 decoder 762 output D0 is applied to a select input S of multiplexer 782. The 1-of-4 decoder 762 output D1 is applied to a select input S of multiplexer 768. The 1-of-4 decoder 762 output D2 is applied to a select input S of multiplexers 784 and 786. The 1-of-4 decoder 762 output D3 is applied to a select input S of multiplexers 770 and 772.

FIG. 8A illustrates an ideal overall effective 2-L error check filter response of the bleacher, matched and 2-L error event filters 308, 310 and 312 of the enhanced noise-predictive maximum-likelihood (NPML) detector 202.

FIG. 8B illustrates an ideal overall effective 4-L error check filter response of the bleacher, matched and 4-L error event filters 308, 310 and 312 of the enhanced noise-predictive maximum-likelihood (NPML) detector 202.

Figure 8C:
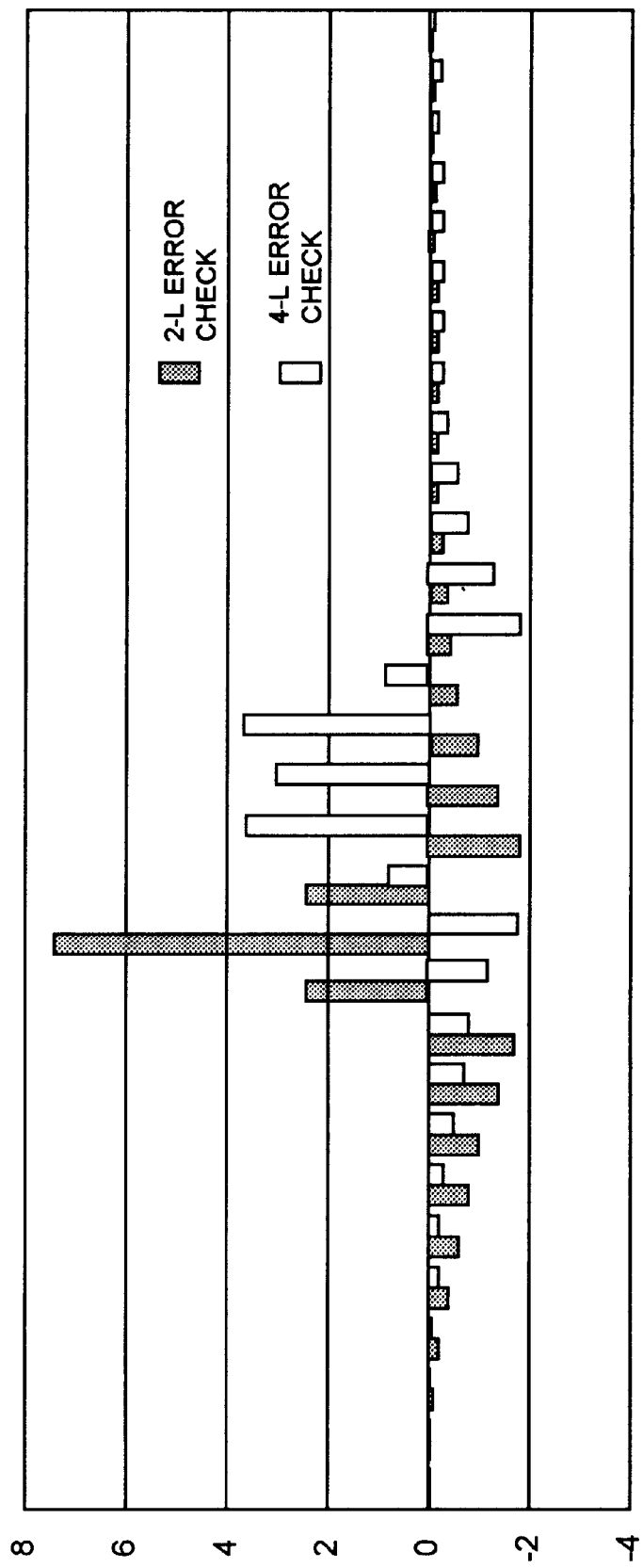
FIGS. 8C and 8D respectively illustrate resulting 2-L and 4-L error check signals of the enhanced noise-predictive maximum-likelihood (NPML) detector of FIG. 3A for a 2-L injected error input and a 4-L injected error input.
Figure 8D:
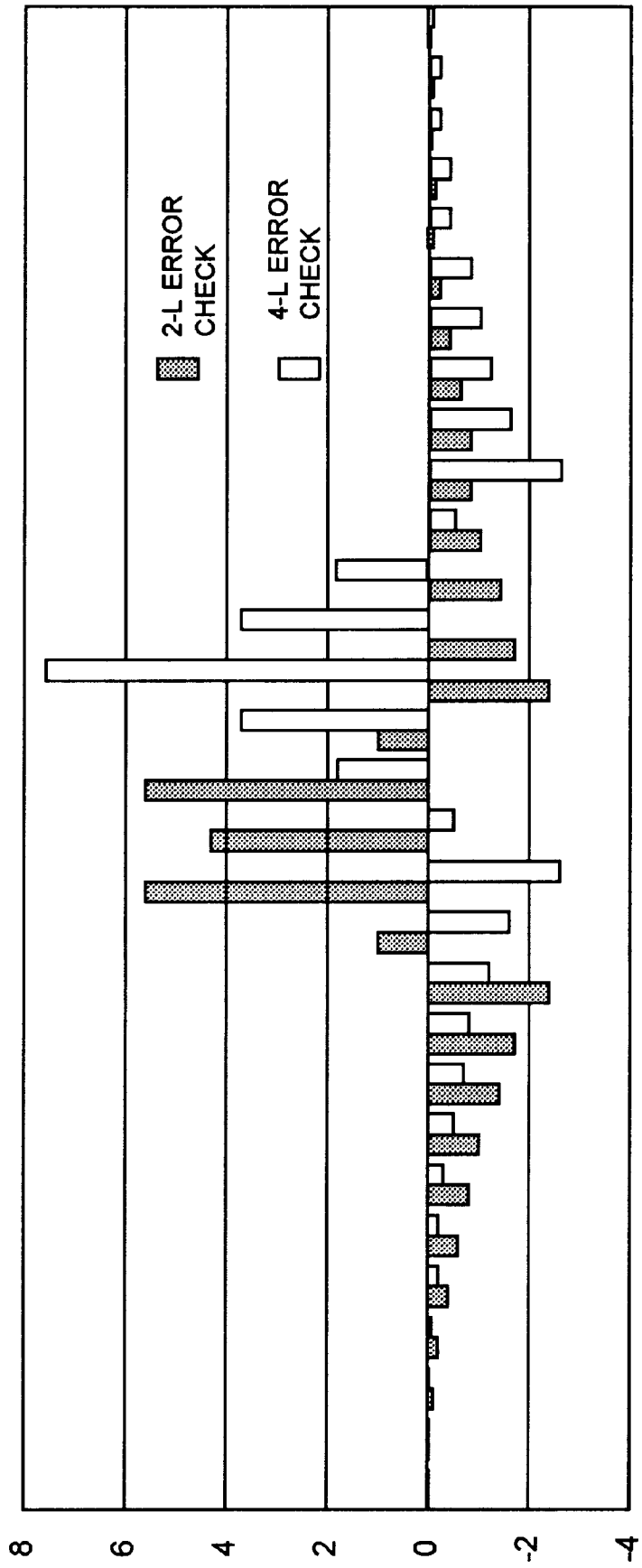

FIGS. 8C and 8D respectively illustrate resulting 2-L and 4-L error check signals of the enhanced noise-predictive maximum-likelihood (NPML) detector 202 for a 2-L injected error input and a 4-L injected error input. Referring to both FIGS. 8C and 8D, note that the 2-L error check signal and the 4-L error check signal are not at maximum magnitude at the same time. In FIG. 8C, with the 2-L injected error input, while a significant 4-L error check signal results a correct 2-L maximum magnitude error check signal is detected. In FIG. 8D, with the 4-L injected error input, while a significant 2-L error check signal results a correct 4-L maximum magnitude error check signal is detected.

TABLE 1

| +/−512 | +/−256 | +/−128 | +/−64 | +/−32 | +/−16 | +/−8 | +/−4 | +/−2 | +/−1 | +/−1/2 | +/−1/4 |
|---|---|---|---|---|---|---|---|---|---|---|---|
| | | | | | | $Y^5$K-24 | $Y^4$K-24 | $Y^3$K-24 | $Y^2$K-24 | $Y^1$K-24 | $Y^0$K-24 |
| | | | | | | | AK-24 | | | | |
| | | | | | | | AK-26 | | | | |
| | | | | | $R^5$K-24 | $R^4$K-24 | $R^3$K-24 | $R^2$K-24 | $R^1$K-24 | $R^0$K-24 | |

TABLE 2

| | +/−512 | +/−256 | +/−128 | +/−64 | +/−32 | +/−16 | +/−8 | +/−4 | +/−2 | +/−1 | +/−1/2 | +/−1/4 |
|---|---|---|---|---|---|---|---|---|---|---|---|---|
| | | | | | | | $R^5$K-24 | $R^4$K-24 | $R^3$K-24 | $R^2$K-24 | $R^1$K-24 | $R^0$K-24 |
| (−16X) | | | $R^5$K-32 | $R^4$K-32 | $R^3$K-32 | $R^2$K-32 | $R^1$K-32 | $R^0$K-32 | | | | |
| (2X) | $L^9$K-26 | $L^8$K-26 | $L^7$K-26 | $L^6$K-26 | $L^5$K-26 | $L^4$K-26 | $L^3$K-26 | $L^2$K-26 | $L^1$K-26 | $L^0$K-26 | | |
| | $L^9$K-24 | $L^8$K-24 | $L^7$K-24 | $L^6$K-24 | $L^5$K-24 | $L^4$K-24 | $L^3$K-24 | $L^2$K-24 | $L^1$K-24 | $L^0$K-24 | | |

TABLE 3

| | +/−512 | +/−256 | +/−128 | +/−64 | +/−32 | +/−16 | +/−8 | +/−4 | +/−2 | +/−1 | +/−1/2 | +/−1/4 |
|---|---|---|---|---|---|---|---|---|---|---|---|---|
| (1/2X) | | | | | | $T^6$K-34 | $T^5$K-34 | $T^4$K-34 | $T^3$K-34 | $T^2$K-34 | $T^1$K-34 | $T^0$K-34 |
| (−1X) | | | | | | $R^5$K-32 | $R^4$K-32 | $R^3$K-32 | $R^2$K-32 | $R^1$K-32 | $R^0$K-32 | |
| | | | | | $T^6$K-32 | $T^5$K-32 | $T^4$K-32 | $T^3$K-32 | $T^2$K-32 | $T^1$K-32 | $T^0$K-32 | $T^{-1}$K-32 |

TABLE 4

| | +/−512 | +/−256 | +/−128 | +/−64 | +/−32 | +/−16 | +/−8 | +/−4 | +/−2 | +/−1 | +/−1/2 | +/−1/4 |
|---|---|---|---|---|---|---|---|---|---|---|---|---|
| | | | | | $T^6$K-34 | $T^5$K-34 | $T^4$K-34 | $T^3$K-34 | $T^2$K-34 | $T^1$K-34 | $T^0$K-34 | $T^{-1}$K-34 |
| | | | | | $L^9$K-26 | $L^8$K-26 | $L^7$K-26 | $L^6$K-26 | $L^5$K-26 | $L^4$K-26 | $L^3$K-26 | |
| (1/8X) | | | | | $SK^6$K-34 | $SK^5$K-34 | $SK^4$K-34 | $SK^3$K-34 | $SK^2$K-34 | $SK^1$K-34 | $SK^0$K-34 | $SK^{-1}$K-34 |

TABLE 5

| | +/−128 | +/−64 | +/−32 | +/−16 | +/−8 | +/−4 | +/−2 | +/−1 | +/−1/2 | +/−1/4 | +/−1/8 | +/−1/16 |
|---|---|---|---|---|---|---|---|---|---|---|---|---|
| | | | | $Y^5$K-24 | $Y^4$K-24 | $Y^3$K-24 | $Y^2$K-24 | $Y^1$K-24 | $Y^0$K-24 | | | |
| | | | | | AK-24 | | | | | | | |
| | | | | | AK-26 | | | | | | | |
| (1/2X) | | | | $H^5$K-26 | $H^4$K-26 | $H^3$K-26 | $H^2$K-26 | $H^1$K-26 | $H^0$K-26 | $H^{-1}$K-26 | | |
| | $H^6$K-24 | $H^5$K-24 | $H^4$K-24 | $H^3$K-24 | $H^2$K-24 | $H^1$K-24 | $H^0$K-24 | $H^{-1}$K-24 | $H^{-2}$K-24 | | | |
| (SAT) | | | $H^5$K-24 | $H^4$K-24 | $H^3$K-24 | $H^2$K-24 | $H^1$K-24 | $H^0$K-24 | $H^{-1}$K-24 | $H^{-2}$K-24 | | |

TABLE 6

| | +/−128 | +/−64 | +/−32 | +/−16 | +/−8 | +/−4 | +/−2 | +/−1 | +/−1/2 | +/−1/4 | +/−1/8 | +/−1/16 |
|---|---|---|---|---|---|---|---|---|---|---|---|---|
| | | | $H^5$K-32 | $H^4$K-32 | $H^3$K-32 | $H^2$K-32 | $H^1$K-32 | $H^0$K-32 | $H^{-1}$K-32 | $H^{-2}$K-32 | | |
| (1/2X) | | | | $H^5$K-30 | $H^4$K-30 | $H^3$K-30 | $H^2$K-30 | $H^1$K-30 | $H^0$K-30 | $H^{-1}$K-30 | $H^{-2}$K-30 | |
| (1/4X) | | | | | $H^5$K-28 | $H^4$K-28 | $H^3$K-28 | $H^2$K-28 | $H^1$K-28 | $H^0$K-28 | $H^{-1}$K-28 | |
| (1/4X) | | | | | $H^5$K-26 | $H^4$K-26 | $H^3$K-26 | $H^2$K-26 | $H^1$K-26 | $H^0$K-26 | $H^{-1}$K-26 | |
| | | | $SK^6$K-32 | $SK^5$K-32 | $SK^4$K-32 | $SK^3$K-32 | $SK^2$K-32 | $SK^1$K-32 | $SK^0$K-32 | $SK^{-1}$K-32 | | |

TABLE 7

| +/−256 | +/−128 | +/−64 | +/−32 | +/−16 | +/−8 | +/−4 | +/−2 | +/−1 | +/−1/2 | +/−1/4 | +/−1/8 |
|---|---|---|---|---|---|---|---|---|---|---|---|
|  |  | SK$^6$K-36 | SK$^5$K-36 | SK$^4$K-36 | SK$^3$K-36 | SK$^2$K-36 | SK$^1$K-36 | SK$^0$K-36 | SK$^{-1}$K-36 |  |  |
|  | (1/4X) |  | SK$^6$K-36 | SK$^5$K-36 | SK$^4$K-36 | SK$^3$K-36 | SK$^2$K-36 | SK$^1$K-36 | SK$^0$K-36 | SK$^{-1}$K-36 |  |
|  | (1/2X) |  | SK$^6$K-35 | SK$^5$K-35 | SK$^4$K-35 | SK$^3$K-35 | SK$^2$K-35 | SK$^1$K-35 | SK$^0$K-35 | SK$^{-1}$K-35 |  |
|  | (1/2X) |  | SK$^6$K-37 | SK$^5$K-37 | SK$^4$K-37 | SK$^3$K-37 | SK$^2$K-37 | SK$^1$K-37 | SK$^0$K-37 | SK$^{-1}$K-37 |  |
|  | TL$^7$K-36 | TL$^6$K-36 | TL$^5$K-36 | TL$^4$K-36 | TL$^3$K-36 | TL$^2$K-36 | TL$^1$K-36 | TL$^0$K-36 | TL$^{-1}$K-36 |  |  |

TABLE 8

| +/−256 | +/−128 | +/−64 | +/−32 | +/−16 | +/−8 | +/−4 | +/−2 | +/−1 | +/−1/2 | +/−1/4 | +/−1/8 |
|---|---|---|---|---|---|---|---|---|---|---|---|
|  | TL$^7$K-38 | TL$^6$K-38 | TL$^5$K-38 | TL$^4$K-38 | TL$^3$K-38 | TL$^2$K-38 | TL$^1$K-38 | TL$^0$K-38 | TL$^{-1}$K-38 |  |  |
| (1/2X) |  | TL$^7$K-38 | TL$^6$K-38 | TL$^5$K-38 | TL$^4$K-38 | TL$^3$K-38 | TL$^2$K-38 | TL$^1$K-38 |  |  |  |
|  | TN$^7$K-38 | TN$^6$K-38 | TN$^5$K-38 | TN$^4$K-38 | TN$^3$K-38 | TN$^2$K-38 | TN$^1$K-38 | TN$^0$K-38 |  |  |  |

TABLE 9

| +/−256 | +/−128 | +/−64 | +/−32 | +/−16 | +/−8 | +/−4 | +/−2 | +/−1 | +/−1/2 | +/−1/4 | +/−1/8 |
|---|---|---|---|---|---|---|---|---|---|---|---|
|  | TL$^7$K-38 | TL$^6$K-38 | TL$^5$K-38 | TL$^4$K-38 | TL$^3$K-38 | TL$^2$K-38 | TL$^1$K-38 | TL$^0$K-38 | TL$^{-1}$K-38 |  |  |
|  | TL$^7$K-40 | TL$^6$K-40 | TL$^5$K-40 | TL$^4$K-40 | TL$^3$K-40 | TL$^2$K-40 | TL$^1$K-40 | TL$^0$K-40 |  |  |  |
|  | FN$^7$K-40 | FN$^6$K-40 | FN$^5$K-40 | FN$^4$K-40 | FN$^3$K-40 | FN$^2$K-40 | FN$^1$K-40 | FN$^0$K-40 |  |  |  |

TABLE 10

STATIC THRESHOLD for pole bleacher, matched, 2-L filter structure 400 of FIG. 4A:

| Select Bits | Value in Binary | Value in LSBs |
|---|---|---|
| 00 | 0011101 | 29.5 |
| 01 | 0011110 | 30.5 |
| 10 | 0011111 | 31.5 |
| 11 | 0100000 | 32.5 |

TABLE 11

STATIC THRESHOLD for pole bleacher, matched, 2-L filter structure 500 of FIG. 5:

| Select Bits | Value in Binary | Value in LSBs |
|---|---|---|
| 00 | 0010011 | 19.5 |
| 01 | 0010100 | 20.5 |
| 10 | 0010101 | 21.5 |
| 11 | 0010110 | 22.5 |

While the present invention has been described with reference to the details of the embodiments of the invention shown in the drawing, these details are not intended to limit the scope of the invention as claimed in the appended claims.

What is claimed is:

1. A data detection apparatus for enhanced noise-predictive maximum-likelihood (NPML) data detection in a direct access storage device comprising:
   a data signal from a data channel in the direct access storage device;
   a maximum-likelihood detector receiving said data signal and providing an estimated sequence signal;
   a noise bleacher filter having a frequency response of $(1+\alpha D)/1-\beta D^2)$ coupled to said maximum-likelihood detector receiving a combined estimated sequence signal and said data signal and providing a noise filtered signal;
   a matching filter and at least one error event filter coupled to said noise bleacher filter receiving said noise filtered signal and providing an error event filtered signal; and
   an error correction unit coupled to said maximum-likelihood detector receiving said estimated sequence signal and coupled to said matching and error event filter receiving said error event filtered signal and providing an error corrected estimated sequence signal.

2. The data detection apparatus for enhanced noise-predictive maximum-likelihood (NPML) data detection as recited in claim 1 wherein said noise bleacher filter having said frequency response of $(1+\alpha D)/1-\beta D^2)$ includes an infinite impulse response (IIR) filter.

3. The data detection apparatus for enhanced noise-predictive maximum-likelihood (NPML) data detection as recited in claim 1 wherein said noise bleacher filter having said frequency response of $(1+\alpha D)/1-\beta D^2)$ includes said a having a selected non-zero value less than 1.

4. The data detection apparatus for enhanced noise-predictive maximum-likelihood (NPML) data detection as recited in claim 1 wherein said noise bleacher filter having said frequency response of $(1+\alpha D)/1-\beta D^2)$ includes said a having a selected non-zero value less than 1.

5. The data detection apparatus for enhanced noise-predictive maximum-likelihood (NPML) data detection as recited in claim 1 wherein said noise bleacher filter having said frequency response of $(1+\alpha D)/1-\beta D^2)$ includes a frequency response of $(1+0.5D)/1-0.5D^2)$.

6. The data detection apparatus for enhanced noise-predictive maximum-likelihood (NPML) data detection as recited in claim 1 wherein said matching and error event filter includes a matched filter and at least one predetermined error event filter, each said predetermined error event filter identifying a dominant error event.

7. The data detection apparatus for enhanced noise-predictive maximum-likelihood (NPML) data detection as recited in claim 1 wherein said matching and error event filter includes a finite impulse response (FIR) filter.

8. The data detection apparatus for enhanced noise-predictive maximum-likelihood (NPML) data detection as recited in claim 1 wherein said noise bleacher filter, matching and error event filter includes a four-tap finite impulse response (FIR) filter.

9. The data detection apparatus for enhanced noise-predictive maximum-likelihood (NPML) data detection as recited in claim 1 wherein said noise bleacher filter, matching and error event filter includes a three-tap finite impulse response (FIR) filter.

10. The data detection apparatus for enhanced noise-predictive maximum-likelihood (NPML) data detection as recited in claim 1 wherein said error correction unit coupled to said maximum-likelihood detector receiving said estimated sequence signal and coupled to said matching and error event filter receiving said error event filtered signal providing said error corrected estimated sequence signal includes a counter for identifying a predefined time window, comparator and logic function for identifying a maximum magnitude error event type and polarity, and modify gating logic for correcting said estimated sequence signal and providing said error corrected estimated sequence signal.

11. The data detection apparatus for enhanced noise-predictive maximum-likelihood (NPML) data detection as recited in claim 1 wherein said data signal from said data channel in the direct access storage device includes a class-IV partial response (PR4) signal.

12. The data detection apparatus for enhanced noise-predictive maximum-likelihood (NPML) data detection as recited in claim 11 wherein said maximum-likelihood detector includes a Viterbi detector.

13. The data detection apparatus for enhanced noise-predictive maximum-likelihood (NPML) data detection as recited in claim 12 wherein said combined estimated sequence signal and said detected data signal is represented by $Y_{K-24}+(A_{K-26}-A_{K-24})$, where $Y_{K-24}$ represents said class-IV partial response (PR4) signal and $(A_{K-26}-A_{K-24})$ represents said estimated sequence signal from said Viterbi detector.

14. A direct access storage device comprising:
a data channel providing a detected data signal;
a maximum-likelihood detector receiving said detected data signal and providing an estimated sequence signal;
a noise bleacher filter having a frequency response of $(1+\alpha D)/1-\beta D^2)$ coupled to said maximum-likelihood detector receiving a combined estimated sequence signal and said detected data signal and providing a noise filtered signal;
a matching filter and at least one error event filter coupled to said noise bleacher filter receiving said noise filtered signal and providing an error event filtered signal; and
an error correction unit coupled to said maximum-likelihood detector receiving said estimated sequence signal and coupled to said matching and error event filter receiving said error event filtered signal and providing an error corrected estimated sequence signal.

15. A data detection method for enhanced noise-predictive maximum-likelihood (NPML) data detection in a direct access storage device comprising the steps of:

receiving a data signal from a data channel in the direct access storage device;
applying the received data signal to a maximum-likelihood detector for providing an estimated sequence signal;
combining the estimated sequence signal and the received data signal to provide a combined signal;
applying the combined signal to a noise bleacher filter having a frequency response of $(1+\alpha D)/1-\beta D^2)$ for providing a noise filtered signal;
applying said noise filtered signal to a matching filter and at least one error event filter for providing an error event filtered signal; and
applying said estimated sequence signal and said error event filtered signal to an error correction unit for providing an error corrected estimated sequence signal.

16. The data detection method for enhanced noise-predictive maximum-likelihood (NPML) data detection in a direct access storage device as recited in claim 15 wherein said step of combining the estimated sequence signal and the received data signal includes the step of providing a predefined delay to the received data signal, said predefined delay matching said maximum-likelihood detector.

17. The data detection method for enhanced noise-predictive maximum-likelihood (NPML) data detection in a direct access storage device as recited in claim 15 wherein said step of applying the combined signal to said noise bleacher filter having said frequency response of $(1+\alpha D)/1-\beta D^2)$ for providing a noise filtered signal includes the step of providing said noise bleacher filter having said frequency response of $(1+\alpha D)/1-\beta D^2)$, where $\beta$ has a selected non-zero value less than 1.

18. The data detection method for enhanced noise-predictive maximum-likelihood (NPML) data detection in a direct access storage device as recited in claim 15 wherein said step of applying the combined signal to said noise bleacher filter having said frequency response of $(1+\alpha D)/1-\beta D^2)$ for providing a noise filtered signal includes the step of providing said noise bleacher filter having said frequency response of $(1+\alpha D)/1-\beta D^2)$, where $\alpha$ has a selected non-zero value less than 1.

19. The data detection method for enhanced noise-predictive maximum-likelihood (NPML) data detection in a direct access storage device as recited in claim 15 wherein said step of applying the combined signal to said noise bleacher filter having said frequency response of $(1+\alpha D)/1-\beta D^2)$ for providing a noise filtered signal includes the step of providing said noise bleacher filter having said frequency response of $(1+0.5D)/1-0.5D^2)$.

20. A data detection method for enhanced noise-predictive maximum-likelihood (NPML) data detection in a direct access storage device comprising the steps of:
receiving a class-IV partial response (PR4) signal from a data channel in the direct access storage device;
applying the received PR4 data signal to a maximum-likelihood detector for providing an estimated sequence signal;
subtracting the estimated sequence signal from a delayed PR4 data signal to provide a combined signal;
applying the combined signal to noise predictive maximum-likelihood detector for providing an error corrected estimated sequence signal, said noise predictive maximum-likelihood detector including a noise bleacher filter having a frequency response of $(1+\alpha D)/1\beta D^2)$ for providing a noise filtered signal.

* * * * *

UNITED STATES PATENT AND TRADEMARK OFFICE
CERTIFICATE OF CORRECTION

PATENT NO. : 6,158,027
DATED : Dec. 5, 2000
INVENTOR(S) : Gregory S. Bush, Roy D. Cideciyan, Jonathan D. Coker, Evangelos S. Eleftheriou, Richard L. Galbraith and David J. Stanek It is certified that an error appears in the above-identified patent and that said Letters Patent is hereby corrected as shown below:

Claim 4, Col. 12, Line 59, "said a" should be --said $\beta$--.

Signed and Sealed this

Eighth Day of May, 2001

Attest:

NICHOLAS P. GODICI

Attesting Officer   Acting Director of the United States Patent and Trademark Office